July 18, 1967
J. A. WINKER ETAL
3,331,573
PARACHUTE
Filed July 30, 1964
4 Sheets-Sheet 2
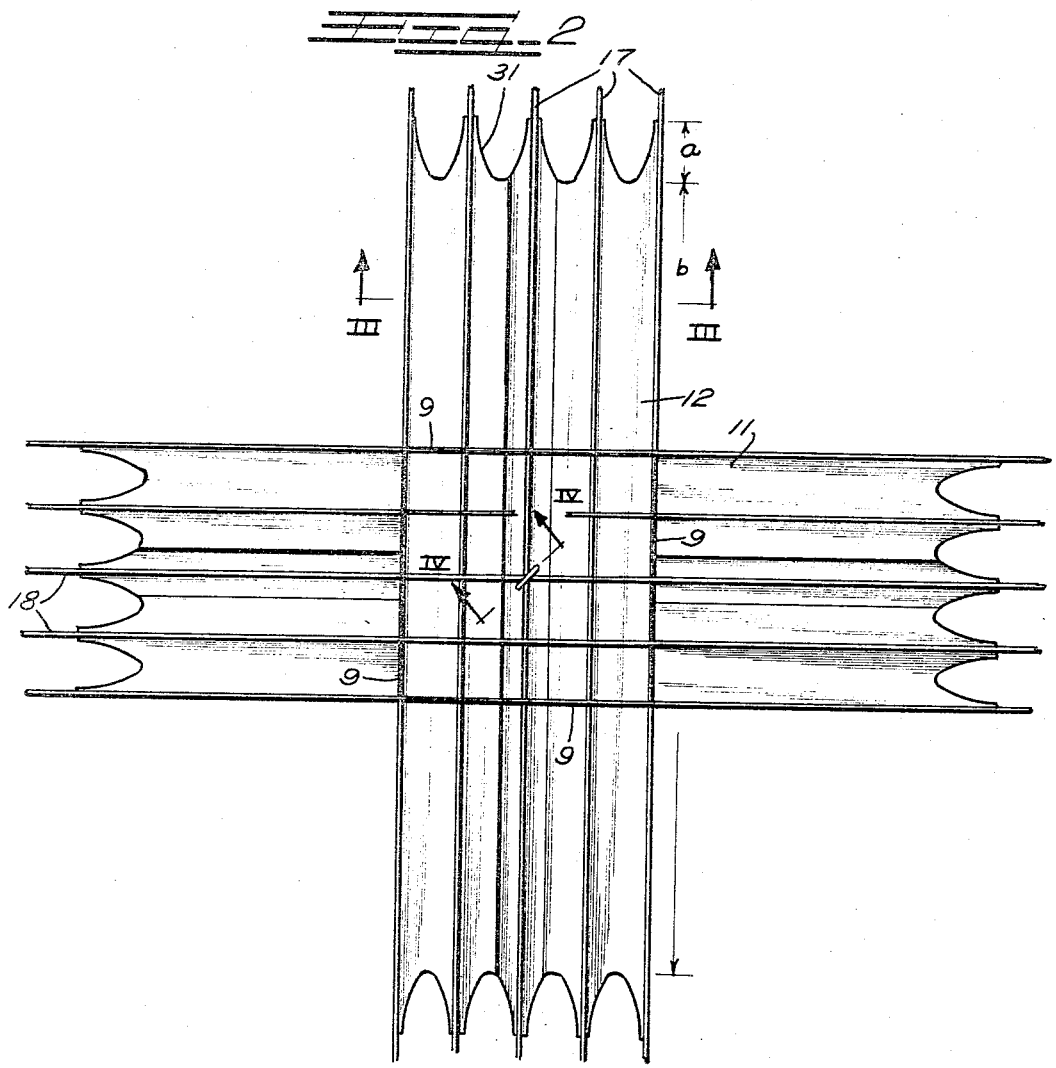
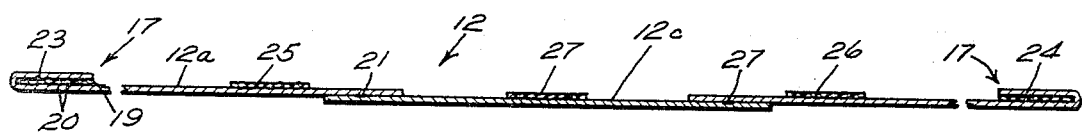
INVENTOR.
James A. Winker
Gene P. Hanson
Russell A. Pohl
BY
ATTORNEYS July 18, 1967 J. A. WINKER ETAL 3,331,573
PARACHUTE
Filed July 30, 1964 4 Sheets-Sheet 3
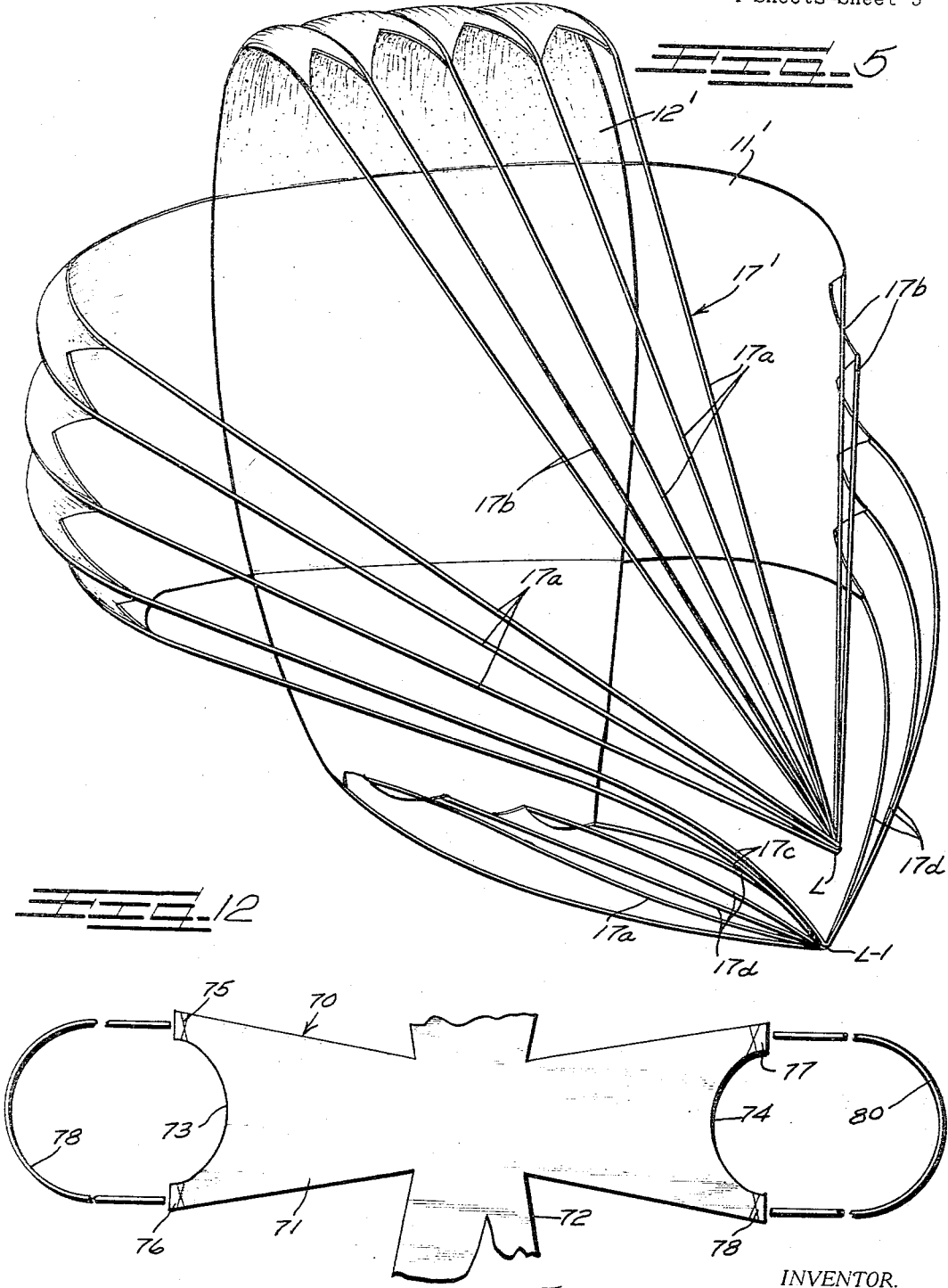
INVENTOR.
James A. Winker
Gene P. Hanson
Russell A. Pohl
BY Hill, Sherman, Meroni, Gross & Simpson
ATTORNEYS

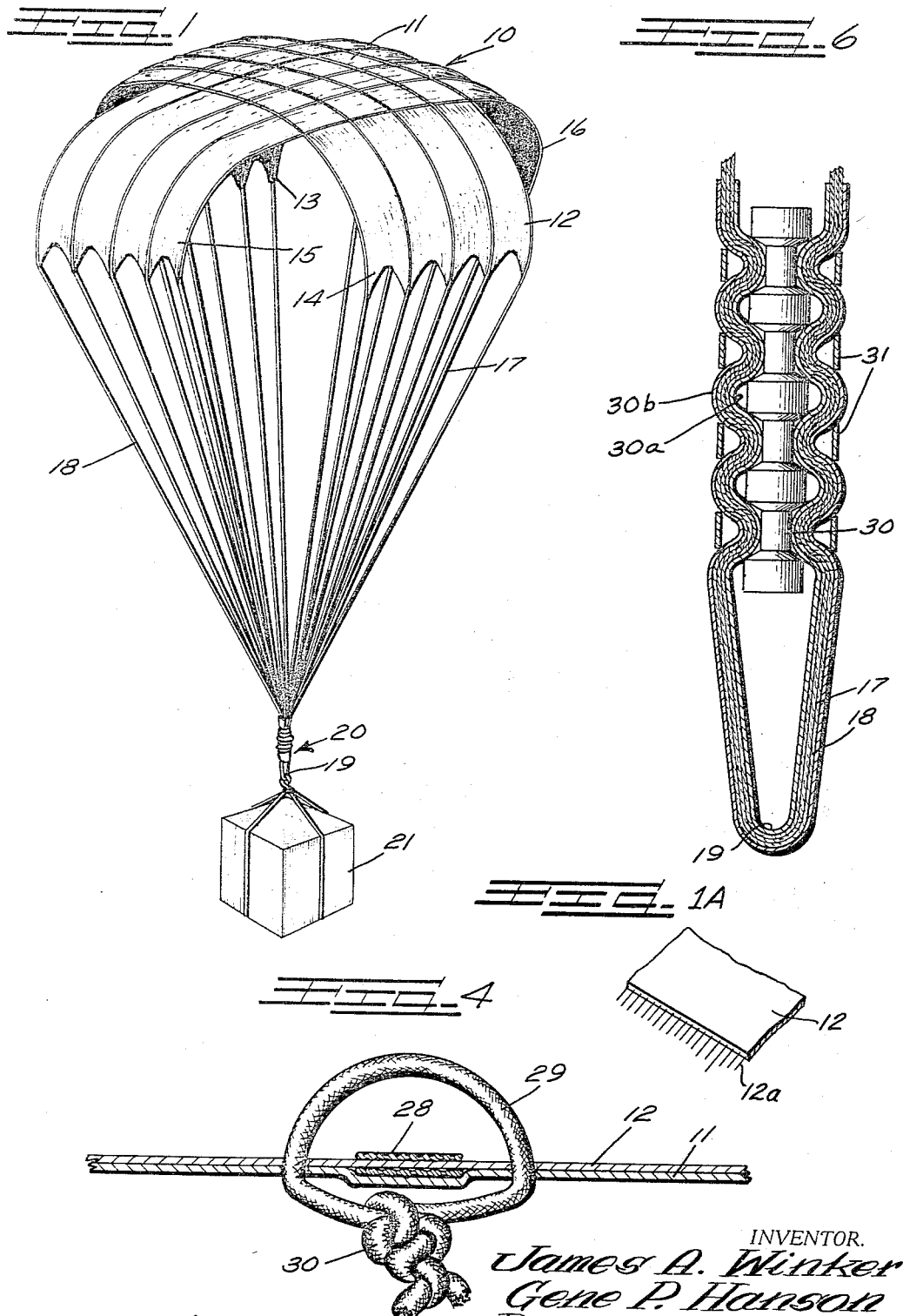

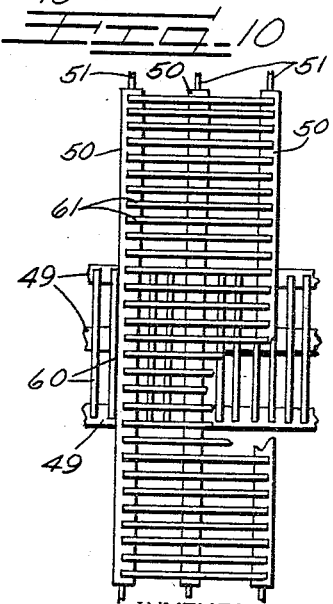

United States Patent Office 3,331,573
Patented July 18, 1967

3,331,573
PARACHUTE
James A. Winker, Gene P. Hanson, and Russell A. Pohl, Sioux Falls, S. Dak., assignors to Raven Industries, Inc., Sioux Falls, S. Dak., a corporation of South Dakota
Filed July 30, 1964, Ser. No. 386,273
8 Claims. (Cl. 244—145)

The present invention relates to improvements in parachutes and particularly to a parachute construction which has a design which can be extrapolated for use in load sizes ranging from very small loads to very large loads.

A parachute design which is fully suitable for a wide range of uses should be capable of being constructed in a wide range of load sizes, must be capable of offering a stable drag producing surface for such needs which dictate a device for safe delivery to earth from an altitude, or must provide a stable decelerating or orienting device, and/or must be capable of providing any combination of such requirements. These types of parachute structures are generally carried aloft in a packed condition and deployed to perform the functions of applying a force to a load for deceleration or orientation or retarding speed of movement for safe recovery of the load. The types of loads handled usually dictate reliability as a positive requirement and many other requirements are essential and desirable for obtaining a completely suitable parachute for many purposes and to avoid disadvantages inherent in parachute structures heretofore available.

It is an object of the present invention to provide a low-cost easily and inexpensively manufactured parachute which can be considered disposable and yet which offers advantages of more expensive parachute structures and further offers advantages not possessed by other structures.

A further object of the invention is to provide an improved parachute which eliminates disadvantages and expenses now involved in fabric canopy parachutes which are often inconvenient in the problems involved in recovery, drying, repairing and repacking, as well as in the initial cost.

Another object of the invention is to provide an improved low-cost lightweight parachute which possesses comparable operational parameters as typical fabric parachutes now available. A still further object of the invention is to provide an improved parachute construction which will lend itself to non-complicated production procedures and which enable the design to be extrapolated in size to cover virtually the entire range of contemplated droppable loads, and which makes possible the utilization of plastic films in such a way that the advantageous properties of the film are utilized without encountering disadvantageous properties with respect to parachute performance.

A further feature of the present invention is the provision of a parachute construction formed of lightweight plastic film embodying flat plastic rectangles oriented 90° from each other with shroud tapes extending from the ends of the rectangles and with other features of construction which provide the objectives and advantages above set forth in addition to those which result from the constructional features.

Other objects, advantages and features will become more apparent with the teaching of the principles of the present invention in connection with the disclosure of the preferred embodiments thereof in the specification, claims and drawings, in which:

FIGURE 1 is a perspective view of a parachute, shown in descent, constructed and operating in accordance with the principles of the present invention;

FIGURE 1a is an enlarged fragmental perspective view showing a form of material which may be used;

FIGURE 2 is a fragmentary plan view of a parachute construction in accordance with the present invention;

FIGURE 3 is a fragmentary sectional view taken substantially along line III—III of FIGURE 2;

FIGURE 4 is a fragmentary sectional view taken substantially along line V—IV of FIGURE 2;

FIGURE 5 is a perspective view illustrating a parachute and shroud line arrangement;

FIGURE 6 is a fragmentary sectional view taken through the load bearing lower end of the shroud lines;

FIGURES 7–10 are plan views showing modified structural arrangements;

FIGURE 11 is a detailed view showing a structural relationship between shroud lines and parachute panels; and FIGURE 12 is a plan view illustrating a shape used primarily with a tied shroud line.

As shown on the drawings:

FIGURES 1 and 2 illustrate a parachute 10 formed of a first broad lightweight plastic film panel 11 and a second thin lightweight plastic film panel 12. The second panel 12 is oriented with respect to the first so as to extend substantially at right angles thereto.

The rectangular panels may be formed of continuous uninterrupted material, as shown in FIGURES 1 and 2, or may take the form of parallel bands or ribbons as will be described in connection with other figures.

The panels after being formed and assembled in the relationship shown in FIGURE 2 may easily be attached to each other such as by forming heat seals along the edges 9 where the panels overlap. The panels may be attached by continuous heat seals or tacked in the corners or at spaced intervals or may be attached by other means such as by a suitable cement or by sewing.

The rectangular panels may be continuous uninterrupted material or be formed of sheets heat sealed to each other to form continuous panels and a lightweight thermoplastic material such as polyethylene is well suited for use. Other types of plastics which are lightweight and have substantial tensile strength are also well suited, and the film may be reinforced such as by being backed with a fabric or may be reinforced by placing yarns or lines of material providing tensile strength laminated between layers of plastic film. As an example of a reinforced film well suited for use in the present structure, a laminate of two films each less than .015 inch thick of flexible foldable non-fibrous synthetic resin characterized by 20%–800% elongation before tensile failure may be used, adhesively attached to each other with a substantially permanently tacky adhesive and having embedded in the adhesive a grid of fibrous organic polymeric substantially only slightly twisted strands of multi-filament roving, with the strands being slidable both lengthwise and sidewise in the adhesive. The twisted strands may be of multi-filamentary 500–2400 denier roving having from 1 turn per foot to four turns per inch of twist therein. Such twisted strands are illustrated at 12a in FIGURE 1a being imbedded in the plastic material 12. Various types of films may be selected such as for example a plasticized synthetic resin selected from a group consisting of polymers of polyvinyl chloride and copolymers thereof with polyvinylidene chloride and polyvinyl acetate. With the use of lightweight films a resultant lightweight parachute is obtained and by providing only the center portion overlapped the ends extend downwardly and are free from attachment to each other so that they can shift independently of each other. The downwardly extending portions or ends each represent a length of substantially 33½% of the total length and are preferably at least 25% of the total length but not more than 40% of the total length.

By not fully attaching the overlapped areas but attaching the areas at selected locations only, the material can shift independently with stress thus increasing the maximum strength of the material and improving the operability of the parachute permitting it to achieve a shape more closely approaching an optimum functional shape for the force applying purpose for which the parachute is designed.

It has been found that improved results are achieved by maintaining a range of sizes for the rectangular panels and an optimum length to width range for the panels will be substantially 3:1. The range is preferably between 2:1 and 5:1.

The force of the parachute is transmitted to the load by shroud lines shown at 18 for the panel 11. Outside shroud lines extend along the two edges of the panel and additional shroud lines extend at substantially uniform spaced intervals across the panel. The shroud lines, as illustrated in FIGURES 1 and 5 each form continuous loops for strength and for improved coaction with the panels. For example, in FIGURE 5, the load line 17a extending down from the two ends of the panel 12 is continuous and is originally provided in a continuous loop such as having the ends spliced to each other. The splice may be arranged so that it occurs somewhat intermediate the ends of the panel but may be situated at other locations. Each of the lines shown are formed in continuous loops and pass above the panels so that the load in effect is transmitted to a harness of lines which rest on top of the panels.

In general assembly, as illustrated by the finished product in FIGURE 1, the shroud lines for the uppermost panel are laid across the panel. The lowermost panel is then placed in position beneath the uppermost panel. Finally, the last shroud lines parallel to the lowermost panel are placed on top of the complete assembly. That is, they extend above both panels and above the tapes which are parallel to the uppermost panel. The loads on both tapes are therefore transmitted to both panels.

The shroud lines 17 and 18 are secured to each other or connected by a fitting 20 at their lower end to form a load carrying loop 19 which supports a load 21, FIGURE 1.

A relationship between the load line and the panels is shown in detail in FIGURE 3. The panel 12 is illustrated as being formed of a series of strips which are secured to each other along their edges to form an integral panel 12. Strips 12a, 12b and 12c are shown as sealed to each other along seams 21 and 22 which may be heat sealed or sewn or otherwise suitably attached. The edges of the panel 12 are turned inwardly to cover the side shroud lines or tapes 23 and 24, which lines are indicated generally by the numeral 17 in FIGURES 1 and 2. Additional shroud tapes 25, 26 and 27 are located at spaced intervals between the edges of the panel 12. These tapes may also be suitably attached to the panel 12 of film by heat sealing, cementing or stitching. The load tapes may be formed of a plastic material having reinforcing threads embedded therein. As an example of a well suited shroud line, two layers of polyethylene are provided with yarns of polypropylene laminated between the layers and extending longitudinally thereof, which is the direction of load stress.

It has been found that a substantially improved structure is obtained by providing the panels with extension areas at the ends and forming catenary curves in the extension areas between each of the shroud lines.

As shown in FIGURE 2, the length of the extension areas is represented by $a$, with the length of the main portion of the panel represented by the dimension $b$ and the width between the shroud lines by the dimension $c$. The length $a$ is preferably 1 to 1½ times the width $c$ for optimum design and is preferably in the range of 1¼ times the width $c$. The extension area provides the material into which the catenary curves are cut between the load lines 17. The catenary curves are cut for the full depth of the extension area. This catenary pattern provides an overall scalloped pattern and has been found to distribute the stress more evenly in the transition between the shroud lines and the canopy formed by the crossed panels.

Where a line is utilized with the parachute for lifting or supporting the canopy portion, such as required for handling or deployment, a ring 29, FIGURE 4, may be employed which loops through the center crossed tapes as indicated by the tapes 28. This ring may be formed by a line 30 inserted through openings in the canopy and the line knotted.

A preferred arrangement for attaching a load to the parachute is to heat fuse and stitch the interlayers of shroud lines which are formed of nylon webbing. In another arrangement, as shown in FIGURE 6, the load lines at the lowermost portion thereof are interconnected to form the convenient load attaching loop 19. This is done by the insertion of a connector assembly 20 which includes an internal spool 30 having alternating enlarged and recessed portions with the shroud lines or tapes pressed into the recessed portions to hold them in their related positions. In assemblage, the spool 30 is inserted between the crossing shroud lines which are brought together such as in the manner illustrated in FIGURE 1. An inner sheath 30a may be placed over the spool and an outer sheath 30b placed over the lines. Bands or tapes 31 are drawn tightly around the shroud lines 17 and 18 and the sheaths 30a and 30b at the locations of the recesses in the spool 30 to press the lines into the recesses thereby holding them in their related positions. This forms the convenient loop 19 into which a hook or other device from the load is inserted.

In FIGURE 5, an arrangement is shown wherein the load or shroud lines 17' are not continuous loops but are secured to the canopy material at their upper ends. The canopy is formed of a first panel 11' and a second panel 12'. A first group of load lines 17a attached to the end of the panel 12' and loop downwardly at a connection point L and attach to the end of the other panel 11'. Another group of load lines 17b attach to the end of the panel 12' and loop upwardly to the other end of the panel 11' in the manner shown. Similarly, another group of load lines 17c extend down from the end of the panel 11' and attach to the end of the panel 12' in the manner shown. A further group of load lines 17d attach to an end of the panel 11' and loop downwardly to a load point L–1 to attach to an end of the panel 12'.

FIGURE 7 shows a modified form of arrangement wherein two first panels 35 and 36 are employed extending parallel to each other and slightly spaced from each other, and two second panels 41 and 42 cross the first panels 35 and 36 and are attached thereto. Attachment is accomplished such as at the corners of the areas which cross by suitable attaching means such as heat seals.

Shroud lines or tapes 37 extend on the sides of the first panel 35 and similar lines 38 extend on the sides of first panel 36. Similar shroud lines 39 and 40 extend on the sides of the second panels 41 and 42 and the shroud lines are formed in a looped configuration similar to the arrangement which is illustrated in FIGURE 1.

In FIGURE 8, an arrangement is shown wherein a plurality of more narrow first panels 43 are provided. A similar plurality of second panels 44 is provided oriented at right angles to the first panels 43. The first and second panels are interwoven. In other words, the first panels pass over and under alternate second panels. This provides a stable coaction between the panels and eliminates the need for surface attachment although the panels can be attached if desired.

The ends of the panels can be formed with catenary curves such as shown at 47 between the load lines 48. In an alternate arrangement, such as shown at the other end of the first panels 43 in FIGURE 9, tie strips 45 may be secured across the ends of the first panels 43 to maintain their spacing. Where a catenary 47 is used, a curved tie strip 47a may be secured to the ends of the panels to maintain them in their spaced relationship. The second panels 44 are provided with a similar construction at their ends.

In FIGURE 10, a plurality of spaced first panels 49 are employed and a plurality of spaced second panels 50 are oriented at right angles to the first panels 49. Narrow cross first strips 60 extend at spaced intervals across the first panels 49 and are attached thereto. Narrow second strips 61 extend across the second panels 50 and are attached thereto. Each of the sets of panels with the strips thus forms an assemblage with open areas and the panel assemblies may be attached to each other in the area where they cross. Load lines, not shown, extend from the ends of the first panels 49 and load lines 51 extend from the ends of the second panels 50.

In FIGURE 9, an arrangement is shown with spaced panels 50a which have a crossed connected strip 45 at their ends to which shroud lines 46 are connected. These panels 50a may extend to form a parachute arrangement such as that shown in FIGURE 8, or an arrangement such as that of FIGURE 10.

An arrangement for attaching load lines to a canopy which is advantageous in certain circumstances is illustrated in FIGURE 12. A canopy 70 is formed of crossed strips or panels 71 and 72. Each of the panels is of tapered shape with the narrowest portion at the center where the panels cross and extending to a wider portion toward the outer ends. The tapering shape avoids the tendency of the panels to pucker when the load lines are connected at the edges of the panel in the manner shown by the lines 78 and 80. Catenary curves 73 and 74 are formed in the outer ends of the panels providing tails 75 and 76 at one end of the panel 71 and tails 77 and 78 at the other end of the panel. These tails make a convenient end for tying the load lines 78 and 80. The tie can be accomplished by a knot such as that illustrated in FIGURE 11 with the knot being shown at 81 for connecting the line 78 to the tail 75. The knotting arrangement may also be used with rectangular panels although the tendency to pucker frequently is present.

The construction in accordance with the foregoing will achieve or surpass operational parameters of typical fabric parachutes and will fall into a cost range of ½ to ⅓ of cost of fabric canopy parachutes. The design lends itself to uncomplicated production procedures and the plastic films utilized are heat sealed or otherwise fabricated very rapidly under mass production procedures. The films are much lower in cost than fabrics and can be considered expendible. The films are available in a greater variety of width than materials heretofore used thereby simplifying fabrication of the parachute canopies.

The criteria which must be fulfilled to provide a plastic film usable for parachute material in accordance with the present invention includes the features of satisfactory tensile strength; commercial availability in large quantities at low cost; heat sealability to itself for bonding via conveniently available procedures; fabric-like packing qualities preventing taking a permanent set or crease after being packed at high densities for long periods of time; capability of withstanding high impact loading and good shock absorbing characteristics; inert to surrounding atmospheres and not subject to degradation over long periods of storage time and over a variety of storage temperatures and conditions.

The shroud line material of course must meet the same requirements and must in addition have a very high tensile strength per unit weight; have excellent shock absorbing characteristics; have availability in a wide range of strengths, have good packing and fabricating characteristics including the ability of being heat sealable; and be available at low costs. The examples provided above meet these requirements and other materials may be used in accordance with the principles herein taught as will be fully appreciated by those versed in the art.

The foregoing structures provide an advantage in fabricating by making available long straight heat seals throughout. Superior strength and reduction in the number of attachments which must be made is achieved by providing the looped shroud lines. Thus, it will be seen that we have provided an improved parachute construction which meets the objectives and advantages above set forth and which is of unusually lightweight material so as to be well suited for transportation in air borne vehicles.

While features of the invention are particularly well suited to use with plastic material, certain objectives of the invention can also be obtained with the use of fabric material or combined fabric and plastic. This is particularly true of the arrangements of FIGURES 7 through 11.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. A parachute construction comprising a parachute canopy having a first panel area and having a second panel area with said areas being coextensive at the center of the canopy and with said areas having downwardly extending ends,
    said ends widening outwardy uniformly with straight side edges from a narrower portion adjacent the center of the canopy to a wider portion at the ends,
    and shroud lines tied to the canopy material at the corners of the ends and extending downwardly for connecting to a load.

2. A parachute construction comprising a parachute canopy having a first panel area and having a second panel area with said areas being coextensive at the center of the canopy and with said areas having downwardly extending ends,
    said ends widening uniformly with straight side edges from a narrower portion adjacent the center of the canopy to a wider portion at the ends,
    and shroud lines extending downwardly and connected to the panel areas of the corners thereof.

3. A parachute construction comprising a parachute canopy having a first panel area and having a second panel area with said areas being coextensive at the center of the canopy and with said areas having downwardly extending ends,
    said ends widening uniformly outwardly with straight side edges from a narrower portion adjacent the center of the canopy to a wider portion at the ends,
    catenary curves formed inwardly between the sides at the ends of each of the panels forming tails at the ends,
    and shroud lines tied to said tails and extending downwardly for attachment to a load.

4. A parachute construction comprising,
    a canopy formed of a first panel area with ends extending downwardly and a second panel area with ends extending downwardly and oriented at 90° with respect to the first panel area,
    shroud lines secured to the panel areas at the ends thereof and extending downwardly from the ends of one panel in a continuous loop to a load connection point and continuing upwardly and connected to the ends of the other panel,
    and means at said connection point for attachment to a load.

5. A parachute construction comprising a canopy formed of a lightweight material,
    shroud lines extending downwardly from the canopy edge in a continuous loop down to a connection point and back up to the canopy edge,
    a connecting spool within the shroud lines loop at said connection point,
    means for clamping the shroud lines to the spool, and
    a sheath over the surface of the shroud lines.

6. A parachute construction comprising,
a first plurality of plastic film panels extending across the top of a parachute with ends extending downwardly,
a second plurality of plastic film panels extending across the top of the parachute oriented at substantially right angles to said first panels with ends extending downwardly,
bonding means attaching said first plurality of panels to said second plurality at areas of overlap to maintain them in oriented relationship,
  said downwardly extending ends of each of said first plurality of panels being free of attachment to the downwardly extending ends of said second plurality of panels,
and shroud lines attached directly to the panels and extending downwardly from said panel ends for supporting a load beneath the parachute.

7. A parachute construction comprising,
a first plurality of plastic film panels extending across the top of a parachute with ends extending downwardly,
a second plurality of plastic film panels extending across the top of the parachute oriented at substantially right angles to said first panels with ends extending downwardly,
  said first and second panels interwoven so that the first panels are beneath certain second panels and above others,
  said downwardly extending ends of each of said first plurality of panels being free of attachment to the downwardly extending ends of said second plurality of panels,
and shroud lines attached directly to the panels and extending downwardly from the ends of the panels for supporting a load beneath the parachute.

8. A parachute construction comprising,
a first plurality of plastic film panels extending across the top of a parachute with ends extending downwardly,
a second plurality of plastic film panels extending across the top of the parachute oriented at substantially right angles to said first panels with ends extending downwardly,
means attaching said panels at their areas of overlap to maintain them in oriented relationship,
  said downwardly extending ends of each of said first plurality of panels being free of attachment to the downwardly extending ends of said second plurality of panels,
shroud lines attached directly to the panels and extending downwardly from said panel ends for supporting a load beneath the parachute, and a plurality of first and second cross strips with the first strips extending laterally of and connected to the first panels and the second strips extending laterally of and connected to the second panels.

References Cited
UNITED STATES PATENTS

| | | | |
|---|---|---|---|
| 2,309,107 | 1/1943 | Giroux | 244—145 |
| 2,349,833 | 5/1944 | Robinson | 244—145 |
| 2,412,392 | 12/1946 | Finken | 244—145 |
| 2,959,385 | 11/1960 | Buhler | 244—145 |
| 2,997,263 | 8/1961 | Forichon | 244—145 |
| 3,152,782 | 10/1964 | Karpf | 244—145 |
| 3,173,636 | 3/1965 | Sepp | 244—145 |
| 3,252,676 | 5/1966 | Frieder | 244—145 |

FOREIGN PATENTS 253,070   7/1964   Australia.

MILTON BUCHLER, *Primary Examiner.*

A. E. CORRIGAN, *Assistant Examiner.*